(12) United States Patent
Woerner et al.

(10) Patent No.: US 9,821,385 B2
(45) Date of Patent: Nov. 21, 2017

(54) CARTRIDGE FOR A CUTTING INSERT

(71) Applicant: Kennametal Inc., Latrobe, PA (US)

(72) Inventors: Hans Woerner, Cadolzburg (DE);
Rudolf Ehrmann, Schillingsfurst (DE)

(73) Assignee: KENNAMETAL INC., Latrobe, PA (US)

( * ) Notice: Subject to any disclaimer, the term of this patent is extended or adjusted under 35 U.S.C. 154(b) by 196 days.

(21) Appl. No.: 14/598,257

(22) Filed: Jan. 16, 2015

(65) Prior Publication Data

US 2015/0209867 A1   Jul. 30, 2015

(30) Foreign Application Priority Data

Jan. 16, 2014   (DE) .................. 10 2014 100 483

(51) Int. Cl.
*B23B 29/12* (2006.01)
*B23C 5/24* (2006.01)

(52) U.S. Cl.
CPC ............ *B23C 5/2472* (2013.01); *B23C 5/241* (2013.01); *Y10T 407/2222* (2015.01)

(58) Field of Classification Search
CPC ......... Y10T 407/1912; Y10T 407/1914; Y10T 407/1916; Y10T 407/1928; Y10T 407/2234; Y10T 407/2236; Y10T 407/2248; B23B 27/1655; B23B 27/1681; B23B 27/1685; B23B 27/1696; B23C 5/2486; B23C 5/2489
See application file for complete search history.

(56) References Cited

U.S. PATENT DOCUMENTS

| 2,440,978 | A | * | 5/1948 | Schlenkert | B23C 5/2403 407/43 |
| 2,791,946 | A | * | 5/1957 | Hewett | B23C 5/2489 82/12 |
| 4,631,994 | A | * | 12/1986 | Jester | B23B 29/04 407/75 |
| 4,790,698 | A | | 12/1988 | Heffron | |
| 4,995,160 | A | | 2/1991 | Schmid | |
| 5,071,291 | A | | 12/1991 | Kaminski | |
| 5,123,787 | A | * | 6/1992 | Hunt | B23C 5/241 407/39 |
| 5,156,501 | A | * | 10/1992 | Pawlik | B23C 5/241 407/36 |
| 5,320,458 | A | | 6/1994 | Reiterman et al. | |
| 5,336,026 | A | * | 8/1994 | Noggle | B23B 29/03421 407/39 |

(Continued)

FOREIGN PATENT DOCUMENTS

| DE | 24 38 872 A1 | 8/1974 | |
| DE | 2522564 B1 | * 9/1976 | B23C 5/241 |

(Continued)

OTHER PUBLICATIONS

Second Office Action for German Application No. 102014100483.3 dated Apr. 11, 2016 and English translation.

*Primary Examiner* — Sunil K Singh
*Assistant Examiner* — Donte Brown
(74) *Attorney, Agent, or Firm* — Ian K. Samways

(57) ABSTRACT

A cartridge for a cutting insert has a carrier, a rocker, which is attached to the carrier so as to be pivotable and has a seat for a cutting insert, and an adjusting element for adjusting the rocker relative to the carrier.

10 Claims, 4 Drawing Sheets

(56) References Cited

U.S. PATENT DOCUMENTS

| | | |
|---|---|---|
| 5,743,688 A | 4/1998 | Kiefer |
| 5,913,643 A * | 6/1999 | Fowler ................ B23B 27/1681 407/36 |
| 6,098,258 A | 8/2000 | Shimomura |
| 2012/0230794 A1 | 9/2012 | Leisner |

FOREIGN PATENT DOCUMENTS

| | | | |
|---|---|---|---|
| DE | 29 50 698 A1 | 12/1979 | |
| DE | EP 0282090 A1 * | 9/1988 | ............. B23C 5/207 |
| DE | 44 30 197 A1 | 8/1994 | |
| DE | 296 06 165 U1 | 4/1996 | |
| DE | 4436779 A1 * | 4/1996 | ......... B23B 27/1681 |
| DE | 29606165 U1 * | 7/1997 | ............. B23C 5/109 |
| DE | 198 00 440 A1 | 1/1998 | |
| SE | DE 102005045751 A1 * | 3/2007 | ......... B23B 27/1696 |
| WO | 9924196 | 5/1999 | |

\* cited by examiner

CARTRIDGE FOR A CUTTING INSERT

CLAIM TO PRIORITY

This application is a National entry application of German Application No. 102014100483.3, filed on Jan. 16, 2014, the entire contents of which is incorporated herein by reference.

FIELD OF THE INVENTION

The invention relates to a cartridge for a cutting insert.

Such a cartridge serves to attach a cutting insert to a tool like a milling disk or a turning/turn broaching disk. The cartridge is exchangeable so that preassembled cartridges can be attached to the tool with little effort.

BACKGROUND OF THE INVENTION

For the precision of the cutting procedure it is important that the cutting insert is attached in a precisely aligned manner on or in the cartridge. Various adjusting devices in this regard are known in the prior art. However, these are unsatisfactory either in terms of the achievable precision or the required effort. It is also known to achieve the alignment precision by means of the seating precision within the cartridge and the associated angular tolerance of the indexable cutter insert.

SUMMARY OF THE INVENTION

The object of the invention is to create a cartridge by means of which a cutting insert can be precisely adjusted with little effort.

To achieve this object, according to the invention a cartridge for a cutting insert is provided that has a carrier, a rocker which is attached to the carrier so as to be pivotable and has a seat for a cutting insert, and an adjusting element by means of which the rocker can be adjusted relative to the carrier. The invention is based on the realization that a rocker is very well suited to be able to adjust a cutting insert with little effort and high precision. On the one hand, the cutting insert can be aligned very precisely relative to a reference plane by means of a pivoting motion. On the other hand, when the adjusting element contacts the rocker at a point which is at a comparatively great distance from the pivot point of the rocker, the rocker can be adjusted very sensitively due to the resulting lever ratios. Furthermore, a mechanically simple design results which can be manufactured economically and robustly.

According to one embodiment of the invention, it is provided that the rocker is attached to the carrier by means of a set screw so as to be pivotable. The set screw thereby has a dual function: on the one hand, it attaches the cutting insert to the rocker and carrier and, on the other hand, it defines the pivot axis of the rocker.

It is then preferably provided that the set screw extends through the seat for the cutting insert. This makes it possible to fasten the cutting insert with little effort in that the set is screwed through a central hole in the cutting insert.

According to one embodiment of the invention, a fastening screw is provided by means of which the rocker can be clamped tightly to the carrier. The fastening screw makes it possible to additionally fix the rocker after it has been aligned by means of the adjusting element.

According to one preferred embodiment it is provided that the adjusting element is an adjusting screw which acts between the rocker and carrier. An adjusting screw offers the advantage that with it a rotary movement can be very precisely converted into an axial adjusting movement and, based on this again, into a pivoting movement of the rocker.

It is preferably provided that the adjusting screw is screwed into the carrier. This avoids possible tolerances of additional components.

According to one embodiment of the invention, it is provided that the adjusting screw has a head that contacts the rocker. This embodiment is characterized by a small production cost.

When the head of the adjusting screw is accommodated in a recess in the rocker, The axial adjusting movement of the screw is converted directly into a pivoting movement of the rocker without other components and their tolerances participating in the adjusting process.

According to a preferred embodiment, the rocker has a guide by means of which it is accommodated in the support so as to be pivotable. The guide ensures that the rocker is guided precisely on the carrier, independent of the set screw, which increases precision.

It is thereby preferably provided that the guide has an arc-shaped shoulder which engages in an arc-shaped guide groove in the support. In this embodiment, the guide itself provides the pivoting movement of the rocker, whereby the precision of the guide is improved.

In order to achieve the aforementioned object, a cartridge with a cutting insert is also provided which is arranged in the seat and is securely tightened against the rocker (and hence the carrier) by means of the set screw. The above explanations are referenced with regard to the resulting advantages.

BRIEF DESCRIPTION OF THE DRAWINGS

The invention will be described using a preferred embodiment that is portrayed in the accompanying drawings. In the drawings.

DETAILED DESCRIPTION OF THE INVENTION

Figure 1:
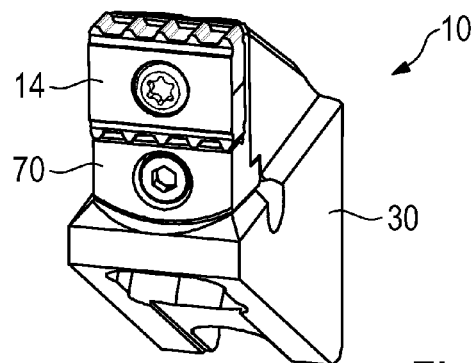
FIG. 1 shows a perspective view of a cartridge according to the invention having a cutting insert.
Figure 2:
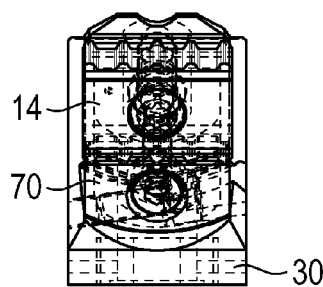
FIG. 2 shows a front view of the cartridge from FIG. 1.

A cartridge 10 is shown in the figures that has a cutting insert 14, a carrier 30 and a rocker 70 as essential components.

The cutting insert 14 here is provided especially for machining crankshafts. To this end, a plurality of cartridges 10 with cutting inserts 14 attached thereto are attached to a milling disk (not shown here). The manner of how the carrier 30 is fastened to the milling disk for this purpose is of no significance to the invention. The specific application of the cutting insert 14 and the cartridge 10 is also irrelevant; the cartridge 10 can be equipped with other types of cutting inserts by means of which other machining steps are performed. The manner of how the cutting insert 14 can be aligned relative to the carrier 30 is relevant in the context of the invention.

The carrier 30 is provided with a bearing block 32 which is provided with a flat contact surface 34 for the rocker 70.

A first threaded hole 36 for a set screw 38 and a second threaded hole 40 for a fastening screw 44 are provided in the bearing block 32.

Between an overhanging section of the bearing block 32 and a contact surface 46 on the carrier 30, a guide 48 is formed which in this case is formed as an arc-shaped guide groove between the contact surface 46 and a guide surface 50 on the overhanging section of the bearing block 32. The curvature midpoint of the guide 48 coincides with the longitudinal axis of the threaded hole 36.

Extending into the arc-shaped guide groove of the guide 48 is a head 52 of an adjusting screw 54 that is screwed into an adjusting screw hole 56 in the carrier. The adjusting screw 54 serves as an adjusting element for the rocker 70 as explained below, and it is accessible from a side surface of the carrier 30.

Figure 5:
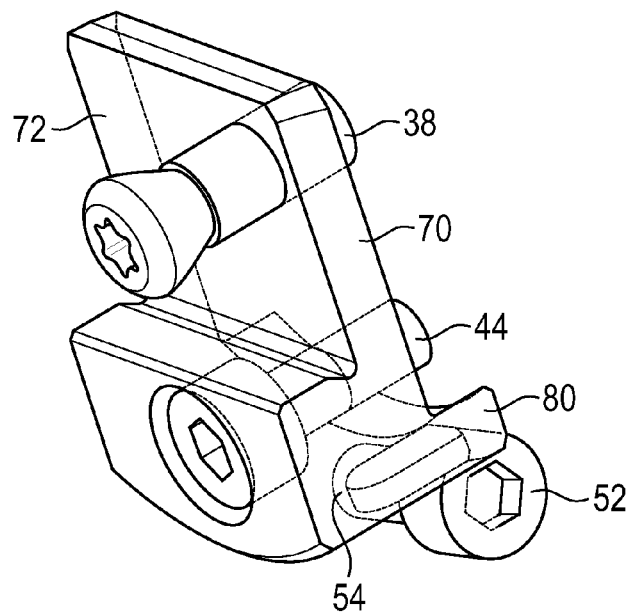
FIG. 5 shows a first perspective view of the rocker.
Figure 6:
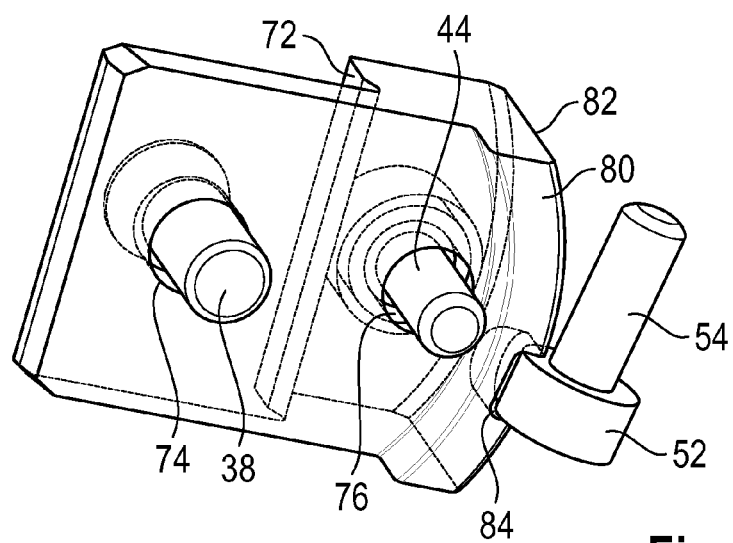
FIG. 6 shows a second perspective view of the rocker.
Figure 7:
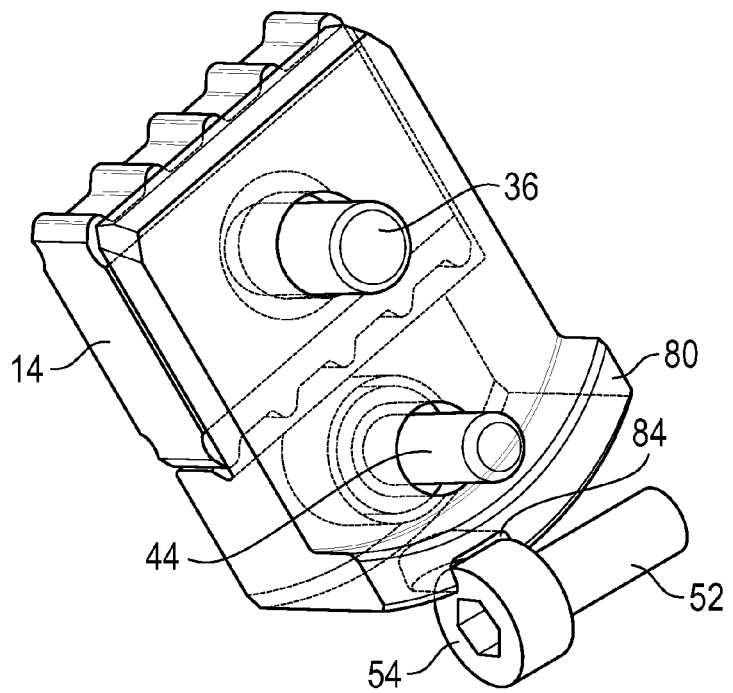
FIG. 7 shows a third perspective view of the rocker, wherein a cutting insert is attached to the rocker.

The rocker 70 (see in particular FIG. 5 to FIG. 7) is generally elongated and, at one end, has a seat 72 for the cutting insert 14. A through-hole 74 for the set screw 38 is also provided in the seat 72.

Abutting the seat 72 is a thickened section of the rocker 70, in which a fastening screw opening 76 is arranged through which the fastening screw 44 extends. The diameter of the fastening screw opening 76 is larger than the diameter of the fastening screw 44, such that a noticeable play exists.

At the end of the rocker facing away from the seat 72, an arc-shaped guide projection 80 is provided whose dimensions and curvature are adapted to the guide 48 in the carrier 30.

Figure 3:
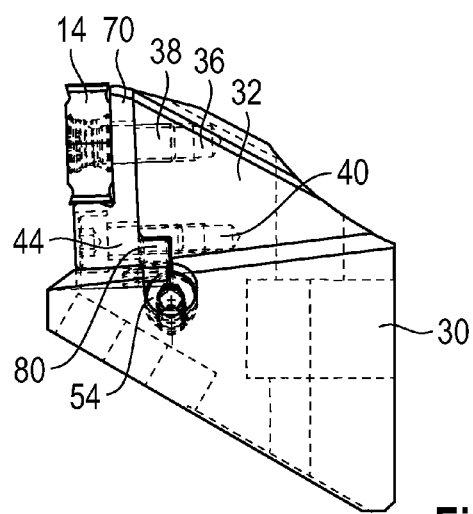
FIG. 3 shows a side view of the cartridge from FIG. 1.
Figure 4:
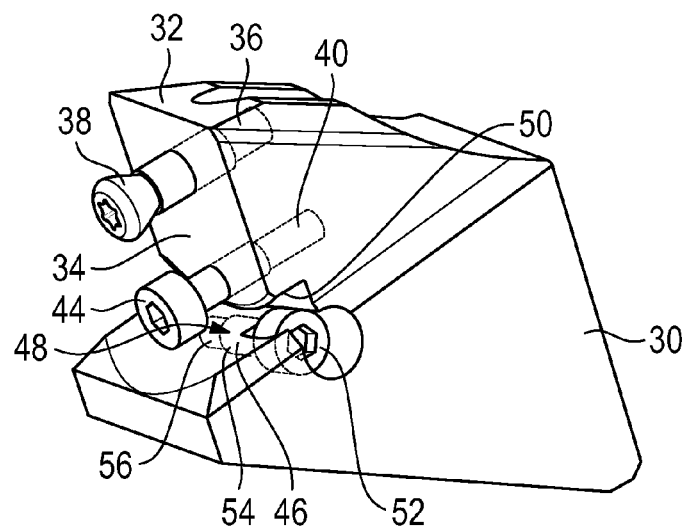
FIG. 4 shows a perspective view of the carrier.
Figure 8:
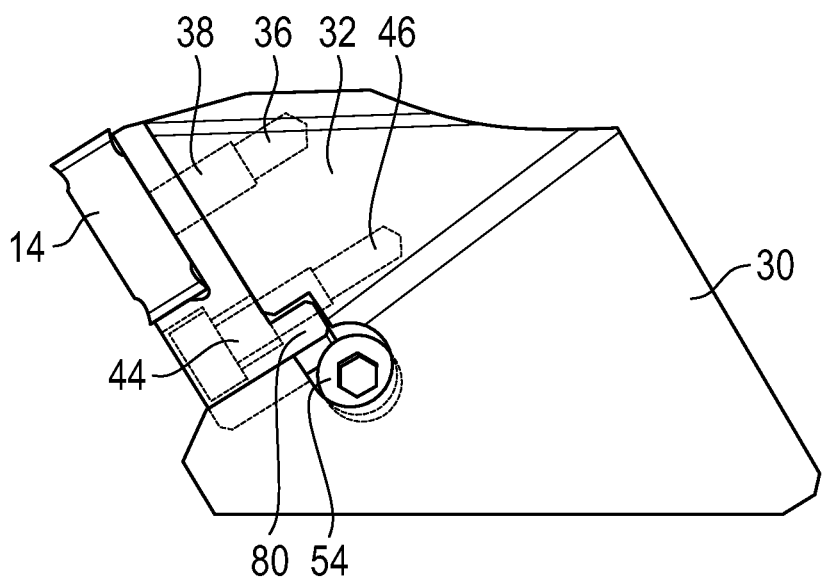
FIG. 8 shows a schematic sectional view of the cartridge.

In the area of the arc-shaped end surface 82 of the rocker 70, a recess 84 is provided in which the head 52 of the adjusting screw 54 engages. As can be seen in particular in FIGS. 3 and 8, the rocker 70 is mounted on a carrier 30 such that the arc-shaped guide projection 80 of the rocker 70 engages in the arc-shaped guide 48 on the carrier 30. The flat rear surface of the rocker facing away from the seat 72 thereby abuts the contact surface 34 of the bearing block 32.

The precise alignment of the rocker 70 relative to the carrier 30 is determined by means of the adjusting screw 54. When it is adjusted in an axial direction by being screwed into or out of the adjusting screw hole 56, this is converted into a pivoting movement of the rocker 70 by the engagement of the head 52 of the adjusting screw 54 in the recess 84. The play between the fastening screw opening 76 and fastening screw 44 is executed so as to enable the pivoting angle of the rocker 70 required for adjustment.

For precise adjustment, first the set screw 38 and fastening screw 44 are preferably initially tightened hand-tight. Then the position of the rocker with the cutting insert 14 mounted thereupon is appropriately adjusted by rotating the adjustment screw 54 clockwise or counterclockwise. In particular, the cutting edges of the cutting insert 14 can be aligned such that they are perpendicular or parallel to a specific reference plane. Once the desired adjustment is achieved, the set screw 38 and fastening screw 44 are screwed tight.

It is particularly advantageous that the contact between the adjustment screw and rocker takes place at a comparatively large distance from the pivot axis of the rocker 70. Due to the lever ratios, a specific axial movement of the adjustment screw is converted into a very small pivot angle of the rocker, which permits a very precise adjustment of the cutting insert alignment. The distance between the adjustment screw and pivot axis of the rocker is in particular of the same order of magnitude as the width of the cutting insert.

What is claimed is:

1. A cartridge for a cutting insert, the cartridge comprising:
   a carrier;
   a rocker which is attached to the carrier so as to be pivotable, the rocker including a seat which accommodates the cutting insert;
   a set screw which attaches the rocker to the carrier, and which permits pivoting movement of the rocker with respect to the carrier about a pivot axis defined by the set screw;
   wherein the set screw extends through the seat accommodating the cutting insert;
   an adjusting element for adjusting the rocker relative to the carrier; and
   a fastening screw which clamps the rocker to the carrier;
   the carrier including an arc-shaped guide groove;
   the rocker including:
      an arc-shaped end surface;
      an arc-shaped guide projection that extends from the arc-shaped end surface and engages the arc-shaped guide groove, to guide pivoting movement of the rocker with respect to the carrier;
      a thickened section disposed adjacent the seat;
      the thickened section comprising an opening which accommodates the fastening screw; and
      a pair of side walls which extend from the arc-shaped end surface, are parallel to one another and define therebetween both the thickened section and the seat.

2. The cartridge according to claim 1, wherein the adjusting element is an adjusting screw which acts between the rocker and the carrier.

3. The cartridge according to claim 2, wherein the adjusting screw can be screwed into the carrier.

4. The cartridge according to claim 3, wherein the adjusting screw has a head that contacts the rocker.

5. The cartridge according to claim 4, wherein the head of the adjusting screw is accommodated in a recess in the rocker.

6. The cartridge according to claim 1, wherein:
   the carrier includes a hole which accommodates the set screw; and
   the pivot axis coincides with a longitudinal axis of the hole.

7. The cartridge according to claim 6, wherein the guide groove has a curvature midpoint which coincides with the longitudinal axis of the hole.

8. The cartridge according to claim 1, wherein the carrier comprises a bearing block, the bearing block including a flat contact surface which contacts and accommodates the rocker.

9. The cartridge according to claim 1, wherein the thickened section and the seat are of a similar lateral dimension, as defined in a direction transverse to the pivoting axis and to the side walls.

10. The cartridge according to claim 1, wherein the opening has a diameter which is larger than a diameter of the fastening screw, to provide play between the fastening screw and the opening.

* * * * *